Jan. 18, 1966  M. J. SOBRAN  3,229,401
CHECKERED GUN STOCK

Filed June 12, 1963  2 Sheets-Sheet 1

INVENTOR.
MICHAEL J. SOBRAN
BY
John D. Wilkins
ATTORNEY

United States Patent Office 3,229,401
Patented Jan. 18, 1966

3,229,401
CHECKERED GUN STOCK
Michael J. Sobran, Woodbridge, Conn., assignor to Olin Mathieson Chemical Corporation, a corporation of Virginia
Filed June 12, 1963, Ser. No. 287,274
2 Claims. (Cl. 42—71)

This invention relates to firearms and more particularly to ornamentation and roughening of the hand grip portion of the gun stock by embossing or grooving, known as checkering, to provide a non-slipping surface.

The common practice heretofore in checkering the hand grip area of the wood stock and has been cutting involving either semiautomatic machinery or manual tools in either event manipulated by highly skilled operators engaged in a tedious and expensive operation. This procedure especially with machinery is limited to gouging the wood in straight lines. More complex patterns may be done by hand carving at great expense.

In an effort to overcome the disadvantages of this prior practice, resort has been made to forming either an embossed veneer of wood or an insert of molded plastic and then attaching this part to the gun as an inlay or overlay. This, however, requires careful fitting and glueing. This, also, has disadvantages of poor performance of certain thermoplastic and thermosetting materials evidenced by cracking, warping, and peeling of the overlay.

Accordingly, an object of this invention is to provide improved machine-pressed checkering suited to economical mass production of any one or more of a variety of patterns, including impressing two or more types of patterns at the same time.

Another object is to form checkering by a means of new and improved die apparatus acting directly on a surface area of the gun stock to produce a wood surface characterized either by a plurality of spaced ridges or points or by a plurality of grooves or pits.

Another object is the direct pressing of intersecting ridges or intersecting grooves of sufficient relief to be sensed readily by fingers seeking a grip of enhanced friction retention but free from raspiness.

Another object is the surface treatment of natural ligno-cellulosic material particularly the hardwoods by heat and pressure to develop a wear-resistant surface embossing on black walnut, cherry, hard maple, and other hardwoods used for gunstocks and characterized by a high lignin content.

The above and other objects as well as the features of this invention will be evident from a description taken in conjunction in the accompanying drawing in which.

According to the present invention a hand grip area of a wooden gun stock is directly treated by embossing under heat and pressure acting together on the wood for a predetermined time by means of a die of preferred configuration adapted to produce a non-slipping pattern of depressions and protrusions. This treatment occurs after adjustment has been made in the heat, pressure, and time conditions of the die, until by trial and error the proper combination of these conditions is found for production of the best impression of deep checkering on the gun stock. According to this invention checkering, which is not to be confused with shallow stippling producing surface matting, may occur on either an end grain surface or on a flat grain surface, the latter being more difficulty to form satisfactorily by embossing. Nevertheless, according to this invention even flat grain surfaces may be acceptably checkered in a variety of ornamental patterns of fretwork in relief.

The present method is especially adaptable to the use of a cross checkering type of die. More specifically, the method is especially adapted to the use of a die particularly of the cameo type, which is characterized by the presence of a number of pointed teeth such as pyramidal teeth. Such a die, under the conditions of heat, pressure and time outlined hereafter, produces a regularly ordered deep stippling providing a negative type of checkering having separate sockets with which an improved grip occurs because of vacuum action. By negative checkering is meant regularly ordered stippling characterized by superficial preferably coplanar crests in the form of straight lines in spaced parallel arrangement intersecting a similar array of straight lines at a desired angle of checkering in the crossed hatched pattern of diamonds desired by shooters.

The crossed hatched pattern commonly available is of the positive checkering types either by closely spaced grooves and relatively sharp pyramidal points or by more widely spaced grooves and relatively flat diamonds or squares, the latter being known as flat top or "English" checkering. This too may be made according to this invention by means of a die of the intaglio type characterized by a cross hatched pattern of linear crests forming widely spaced knife-like edges. Such a die will produce positive checkering in relief involving an ordered arrangement of pyramidal peaks instead of intersecting linear edges.

Figure 1:
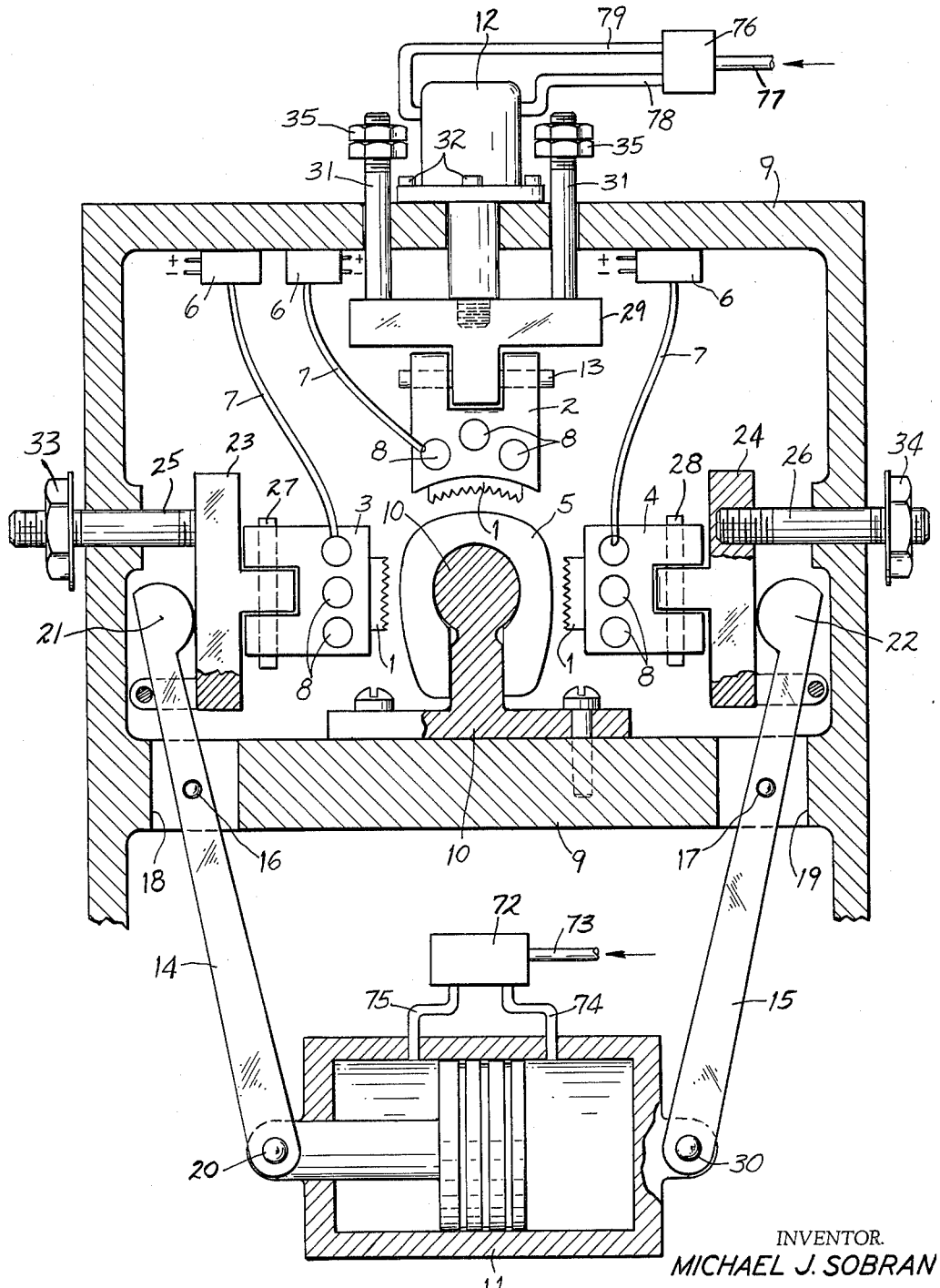
FIG. 1 is a diagrammatic view in side elevation showing one embodiment of apparatus arranged with a piece of wood to be checkered on three faces.

In any event by means of this invention checkering may be produced on the forestock, the pistol grip, and the buttstock of a gun by means of machine pressing or embossing in pattern reproducing apparatus of the type shown in FIGURE 1, where the best patterns produced in this way are of the negative type.

Whether the master die be either the intaglio or cameo type for producing either positive or negative checkering, respectively, the incisions or teeth 1 of the die 2, 3, and 4 are cut by means of a tool producing faces intersecting at a dihedral angle of about 30° to 50°, preferably 40°. In contradistinction to the 90° angle of wood cutters heretofore used, this angle has been found particularly effective in penetrating the wood stock 5 without excessive splitting or excessive blunting of the finished pattern to 0.050 of an inch and more.

The die is brought to a working temperature in the range from about 520° F. to about 650° F. to facilitate embossing by pressing for a time without producing the excessive carbonization which accompanies a branding process. Preferably for rapid operation and the best setting of the ligno-cellulosic bond developed, the temperature is maintained in the range above 600° F., but below 650° F. to avoid burning. Satisfactory checkering has been produced in a walnut gun stock by pressing about 7 seconds at a die temperature of from about 620° F. to about 640° F. with a die having a diamond pyramid tooth shape producing negative checkering on the gun stock. Electric die heating is used; each die has a series of cavities and heaters 8 all snugly received for good conduction to the die faces and their teeth.

The invention involves surface treatment by a heated die directly and without need for an intervening impregnation with any extraneous binder such as a thermoplastic or thermosetting resinous material.

Treatment at elevated temperature occurs with one or more dies held in a pneumatic or hydraulic press capable of exerting an impression force of from about 3,000 pounds to about 12,000 pounds over an embossing area usually not less than about 5 square inches and not more than about 8 square inches.

It is to be understood that larger or smaller areas may be treated, provided the exerted die force is varied in correspondence with the pressure found satisfactory. The exact local pressure exerted on the wood in any particular pattern is determined by the configuration of the die protrusions used and will be very high initially at the sharply pointed spikes or edges. For this reason, it is impractical to specify particular values of pressure. As the impression progresses, the wood pressure tapers off, although the die force may increase to a final finishing force in the range specified. Preferably, the mirror image of the die is impressed. Unit pressure is cut off when the desired impression is done.

The applied pressure varies in effectiveness somewhat with the temperature and time application. At the lower end of the temperature range the pressure may be increased; at the hottest permissible temperature of application a somewhat lower pressure is satisfactory. The effective pressure, however, also varies with the time of application, which in turn varies with the temperature. A somewhat lower pressure is effective at a long time of application, while an increased pressure is needed when the time of application is short. At a temperature of around 520° F. the checkering cycle is about 25 seconds. At the hottest effective temperature, pressure is applied for not more than about 5 seconds.

It is preferred that the wood surface be stained and filled beforehand and contain the usual moisture and volatiles.

The dies 2, 3, and 4 and their protrusions 1 are made of hardened tool steel and in the areas of the protrusions the dies are preferably chromium plated. The surface contour of each die matches closely the shaped surface of the wood stock 5 in the area to be checkered.

The embossing apparatus comprises a supporting frame 9, a gun stock mount 10 carried on the frame 9, and suitable means, such as the fluid cylinder 11 and the fluid cylinder 12, for applying driving force to the dies.

One pair of opposed dies is shown, but it is to be understood one or more added pairs may be used. For example, one pair may impress the forearm sides and another pair impress the grip.

With the stock mounted suitably, the butt may be checkered with still another single die and cylinder set, not shown. Thus, a long stock may be checkered in at least six different areas automatically, after proper mounting in the machine. A round stock may be impressed all around by a suitable series of curved dies, providing a better quality of checkering than attainable by roll embossing.

Driving force is obtained from cylinder 11 by means of any suitable arrangement such as the floating levers 14 and 15, connected at their ends to the cylinder by wrist pins 20 and 30, are mounted at pivot pins 16 and 17 on the supporting frame 9. These levers, extending through frame openings 18 and 19 have on their distal ends clamping blocks 21 and 22 with curved faces adapted to press on die anvils 23 and 24, respectively, slideably mounted on frame 9 by means of suitable guide pins such as 25 and 26 fixed on anvils 23 and 24, respectively. To permit the die faces to adjust themselves to the surface contour of the wood stock 5, each anvil is pivotally mounted at pins 27 and 28 to its respective die 3 and 4, respectively. It is notable that this arrangement of the opposed dies 3 and 4 allows equal and opposite patterns to be impressed simultaneously on the wood stock, thereby equalizing the stresses on the wood and the depth of penetration in both the left hand and right hand patterns, in cooperation with mount 10 and stops.

In addition, die 2, shown for application of a single pattern, is mounted to anvil 29 at pin 13 with limited pivotal movement in the same manner as are the other anvils; in turn anvil 29 is slideably mounted by its guide pins 31 to frame 9 in proper alignment to be acted on by the thrustor of cylinder 12 which is also mounted on the frame by suitable fasteners 32. Bucking is provided by gunstock mount 10.

Electric regulators 6 control the heating current in cables 7 to the resistance elements 8 to bring the temperature of the dies to the effective value, read by the operator on temperature indicating instruments (not shown) actuated by suitable devices such as thermocouples (not shown) mounted in the dies in close proximity with the protrusions 1. Although the temperatures of dies, 2, 3, and 4 are held to about the same general temperature found effective, the operator individually adjusts the temperature of each die more finely by a few degrees higher or lower to compensate for any environmental differences encountered.

Application of the pressure is governed by control devices 72 and 76. At the beginning of the cycle, fluid pressure from inlet line 73 is released by controller 72 to line 74 of cylinder 11, thereby driving the protrusions of dies 3 and 4 into contact with workpiece 5 to accomplish embossing. In close sequence thereafter controller 76 admits fluid pressure from inlet line 77 to line 78 of cylinder 12, which is actuated to thrust die 2 and its protrusions also into contact with the workpiece. After passage of the interval of time found proper, whereupon the depth of impression sought is accomplished, controllers 72 and 76 provide a valve action admitting fluid pressure to return lines 75 and 79 while exhausting lines 74 and 78.

The stop means, upon detection of maximum depth of impression having been reached, may advantageously be associated with controllers 72 and 76 to actuate them to reduce the unit pressure for holding only.

In lieu of cylinder 11, each of dies 3 and 4 may be provided with its own cylinder, interconnected at first by a suitable controller for simultaneous movement into contact with the workpiece and then for simultaneous and/or separate withdrawal as either the timer and/or stop means dictate for accomplishing the right depth of impression and proper set of the autogeneous bond in all the areas treated.

Figure 2:
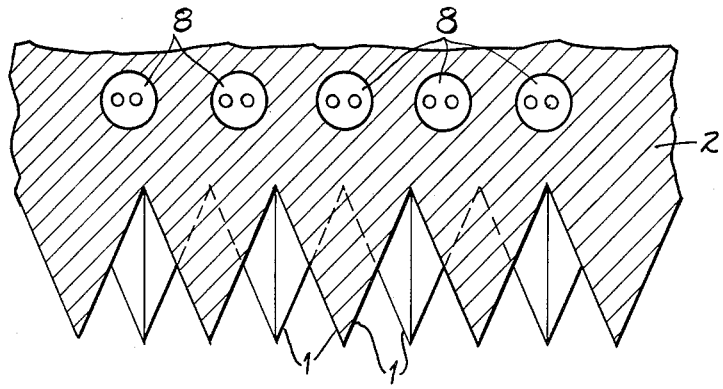
FIG. 2 is a fragmentary cross sectional view through the face of an embossing die according to a preferred embodiment.

As shown in FIGURE 2, a typical die 2 has controlled heaters in good heat conductive relationship with the V-shaped embossing protrusions or teeth 1 formed by a tool in the face at a sharp included tooth angle, preferably about 40°. The sharpness of the tooth angle allows the impression to be made over a surface having a somewhat curved contour without limitation to a perfectly flat surface. At an angle of much less, such as one sharper than 30°, it is difficult to maintain the die face. At a much blunter angle, the impression in the wood is limited to flatter surfaces and tends to be unsatisfactory for one reason or another, such as for the excessively sunken condition of the whole pattern. For simplicity, no curvature is shown in FIGURE 2.

Figure 3:
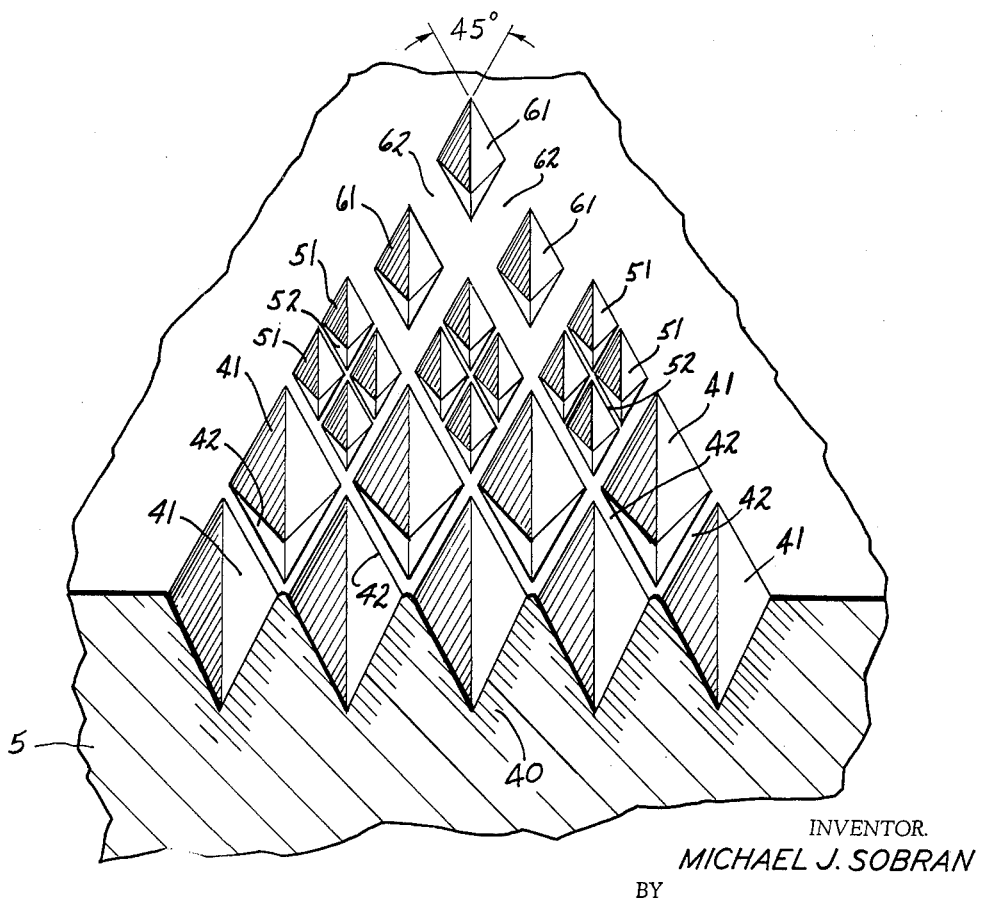
FIG. 3 is a perspective partial view partly in cross section showing a portion of wood stock finished according to this invention.

A typical example of various checkering patterns developed on the wood stock 5 by the die is shown in FIGURE 3. A negative type of cross checkering is shown characterized by ridges free from raspy sharpness and intersecting at some conventional angle such as 45° providing diamond pyramidal pits, indentations or troughs, in the hardened surface 40.

One pattern shown involves troughs 41 extending to a depth of about 0.085 of an inch between parallel crests 42 spaced about $\frac{1}{16}$ of an inch on the stock surface.

A similar but finer pattern of shallower diamond troughs 51 may be made between more closely spaced crests 52, utilizing an angular indentation as before.

Still another but smoother pattern is shown having diamond pyramidal troughs 61 more widely spaced to provide a rather flat topped crest area 62 similar to English checkering.

By the method of this invention it will be understood that articles other than gun stocks, such as handles of tools and other sporting devices, may be advantageously checkered with both utility and ornamentation. An improved hand grip free from raspiness is produced with economy and consistently good high quality. The pattern is not limited to straight lines, or to sharp points to compensate for wear as with cut checkering. The checkering produced may include sockets having a suction cup action and is free from raspiness. The pattern densified by heat and pressure has high resistance to wear.

What is claimed is:

1. A wooden gun stock having an ornamental, permanenetly hardened surface contour over a portion of the area of said stock, said portion comprising a first series of spaced parallel ridges intersected by a second series of spaced parallel ridges, said ridges being integral with said stock, the apexes of said ridges being flush with the surface of the adjacent areas, said intersecting ridges defining pyramidal indentations having a depth of at least 0.050 of an inch, and the wood of said portion being harder than the wood of the remaining area of said stock.

2. The stock of claim 1 wherein the first series of spaced parallel ridges intersects the second series at an angle of about 45°.

References Cited by the Examiner

UNITED STATES PATENTS

| | | | |
|---|---|---|---|
| Des. 80,341 | 1/1930 | Von Frommer. | |
| 443,447 | 12/1890 | Land et al. | 144—328 |
| 675,642 | 6/1901 | Sherrer | 101—9 |
| 859,804 | 7/1907 | Daniel | 42—71 |
| 949,786 | 2/1910 | Waibel | 101—9 |
| 1,037,486 | 9/1912 | Johnson | 42—71 |
| 1,376,917 | 5/1921 | Bump | 42—71 |
| 2,338,685 | 1/1944 | Dee. | |
| 2,341,585 | 2/1944 | Winer | 42—71 |
| 2,665,633 | 1/1954 | Schubert | 101—11 |
| 2,673,414 | 3/1954 | Arnold | 42—71 |
| 2,695,857 | 11/1954 | Lewis et al. | 144—328 |
| 2,701,930 | 2/1955 | Dolan | 42—71 X |

OTHER REFERENCES

Howe, James V.: The Modern Gunsmith, New York, Funk & Wagnalls Co., vol. I, 1937, pp. 179–197.

BENJAMIN A. BORCHELT, *Primary Examiner.*